Sept. 9, 1947. R. W. MUERLE 2,427,299
METHOD OF MAKING SEPARATOR DISCHARGE PANS
Original Filed Dec. 8, 1941

Cream Cover

Inventor:
Richard W. Muerle
By: J. P. Keiper
Attorney

Patented Sept. 9, 1947

2,427,299

UNITED STATES PATENT OFFICE 2,427,299

METHOD OF MAKING SEPARATOR DISCHARGE PANS

Richard W. Muerle, Springfield, Ill., assignor to Montgomery Ward & Co., Incorporated, Chicago, Ill., a corporation of Illinois Original application December 8, 1941, Serial No. 422,028. Divided and this application February 19, 1945, Serial No. 578,705

1 Claim. (Cl. 29—148)

This invention has to do primarily with an improvement in the method of making of what is generally termed cream covers and skim milk covers or discharge pans for cream separators and the like.

For a number of years, centrifugal cream separators have been in use to separate butter fat from whole milk. The separated butter fat, in the form of cream, is discharged from a rapidly rotating separator bowl into a cream cover or discharge pan which catches and conducts the cream from the separator to where it is discharged into buckets or other containers. The skim milk is discharged from another portion of the rotating separator bowl, into another generally similar structure known as a skim milk cover or discharge pan. In the past, it has been customary to make these covers of several pieces, generally steel stampings, and weld or solder the parts together to form a complete unit.

Since milk is a highly perishable product, and the utmost importance is attached by State, city, and dairy inspectors and the like to all surfaces and passages contacted by the milk products during the process of separation, it is highly desirable that there be no ridges, roughly soldered seams, poor joints between spout and frame, and portions which resist regular efforts at cleaning. Despite this fact, even the latest styles of tinware (as these skim milk and cream covers are generally designated) have rough joints, crevices and portions that resist cleaning, and covered spouts. It is an object of this invention to provide a method of making a structure which will overcome these objections.

It is an object of applicant's invention to eliminate soldering or other jointing of parts and surfaces used in the conduction of the milk and cream in the construction of this tinware.

It is a further object of applicant's invention to provide a method of construction having less operations and requiring fewer tools and dies than other devices used for the same purpose.

It is a still further object to provide a method of securing to a one piece pan an annular skirt ring, while eliminating or reducing the size of joint crevices to such an extent that an unbroken coating of tin plate may be applied to the skirt and pan.

Other objects and advantages of the invention will appear as the nature of the improvements is better understood, the invention consisting substantially in the novel method of manufacture hereinafter fully described, illustrated in the accompanying drawing, and finally pointed out in the appended claim.

In the drawing, wherein like reference characters indicate like parts,

In cream separators, several pans, one nested in another, are employed for the collection of the separated milk and cream, each of which may be quite similar in structure, although differentiating one from the other for various reasons not relating to the present invention.

Figure 1:
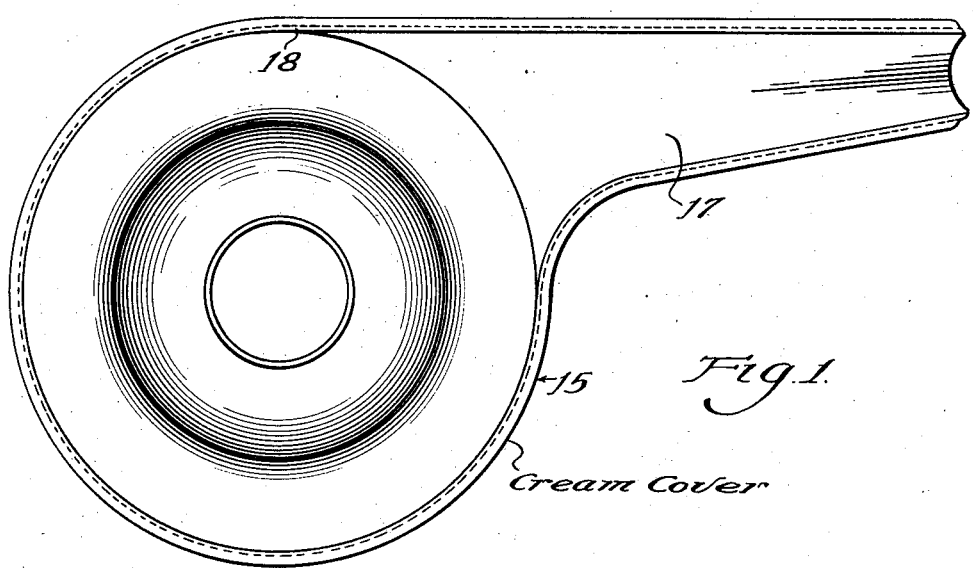
Figure 1 is a top plan view of a cream spout incorporating my new construction, produced by my improved method.
Figure 2:
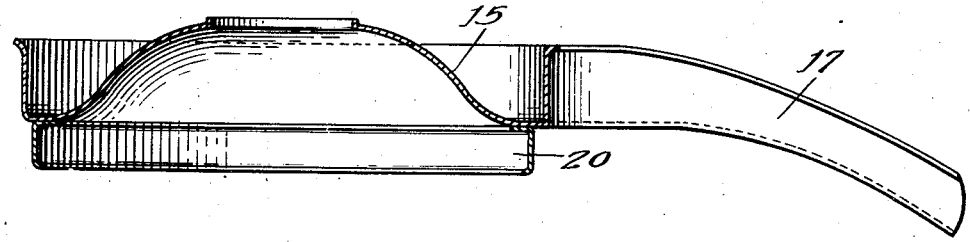
Figure 2 is a longitudinal, cross-sectional, elevational view, showing the device of Figure 1.
Figure 3:
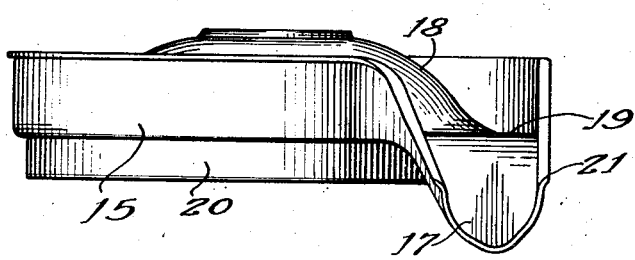
Figure 3 is a vertical elevational view looking directly into the spout portion of the device of Figure 2.

Referring in particular to the construction shown in Figures 1, 2, and 3, which may be a cream cover or pan designated in its entirety as 15, I have provided a construction which, with the exception of the mating flange 20, is stamped out of a single piece of metal using ordinary machinery and a series of dies. A single sheet of metal such as lightweight steel is placed in the dies and the spout 17 and frame 18 and bottom 19 are stamped therefrom in a series of operations known as "draws." That is, the forming is partially done in what is known as a first draw and is continued in a second and additional draws until it is completely formed, trimmed and finished in its final dimensions. The unit is thus made from a single piece of metal.

This forms the device as an open spout which is easily cleaned, and the frame 18 and bottom 19 merge into the spout 17 without a seam and with the various parts having generous radii which will not retard cleaning. Heretofore, the greatest difficulty has been experienced in connecting the spout to the frame and bottom, and to my knowledge there is no construction on the market which does so, without welding or soldering, and with a complete elimination of seams and angles. The open spout is cleaner than the closed spout first, because it is not necessary to form a seam, and secondly because a closed spout does not offer ready access for thorough cleaning. Further, the elimination of sharp angles is seldom possible in a closed spout, and a closed spout must be joined to the rest of the structure by special operations.

As shown in my construction, I have provided the reinforcing flange 21 which adds strength to the construction and springiness and flexibility so that the stacking of the float supporting cover on the cream cover in assembling the units for operation is readily accomplished. With this arrangement, the diameter of the mating flange of the cover or pan above which slips into the inner periphery of the cream cover may be substantially that of the cream cover, assuring a tight fit which will eliminate rattling and will provide a good grip between the mating parts.

The mating flange is spot welded or otherwise attached to the bottom 19 of the cream cover. The mating flange 20 is preferably spot welded to the bottom 19 of the cream cover. This mating flange renders itself readily to what is known as a coining operation which is performed after the flange has been spot welded to the main frame. This coining operation is usually performed with a heavy press under considerable pressure and joins the flange to the main frame and rounds the edges to such an extent that no seam is apparent after the entire unit has been dipped into tin, and appears to all practical purposes as one piece. There should be no seams anywhere on the tinware where bacteria can breed and the jointure between the flange 20 and the frame as formed above is of such a satisfactory type that there is no seam left, in the ordinary sense of the word.

It will be understood that after each unit is formed, it is generally dipped into molten tin which protects the surfaces against corrosion, and makes the pan more sanitary.

The mating flange 20 is stamped out of a single piece of metal in a single operation.

When it is noted that the cream and milk covers must be assembled and disassembled at least twice a day in normal operation, and thoroughly cleaned so as to pass inspection and be sanitary, it will be readily seen that the simplified and sanitary construction of applicant's arrangement has advantages.

This application is a division of my copending application Serial No. 422,028, filed December 8, 1941, now Patent No. 2,379,647.

The form of the invention herein shown and described presents a preferred embodiment thereof, and delineates its adaption to practical use, but it is to be understood that the present disclosure is to be considered from the illustrative standpoint and not as imposing restriction or limitation on the invention.

While I have herein shown and described certain features of my invention, still I do not wish to limit myself thereto, except as I may do so in the claim.

What is claimed is:

The method of making a separator discharge pan which comprises selecting a blank of suitable shape to form an integral pan and spout, drawing said blank to form an annular trough of channel cross section and integral spout of channel cross section with one side wall of said spout being substantially upright and continuously and without break flowing into the outer cylindrical upright wall of said annular trough and around said trough and continuously and without break flowing into the other upright side wall of said spout and with the base of said spout channel being flush with the base of said trough and merging without discontinuity of metal or break, forming a flaring flange around the upper edge of said side wall at a uniform height above the base of said annular trough along the upper edges of said side walls of said spout, said flange being continuous and unbroken, securing an annular angle cross section member having a securing flange portion and depending skirt to the underside of said annular trough, coining said flange and said skirt to upset and force said skirt upwardly into intimate engagement with said trough and said flange into intimate engagement with said trough along its edge, and coating said pan, spout and annular member with tin to provide an unbroken metallic coating overall.

RICHARD W. MUERLE.

REFERENCES CITED

The following references are of record in the file of this patent:

UNITED STATES PATENTS

| Number | Name | Date |
| --- | --- | --- |
| 2,237,535 | Wahl | Apr. 8, 1941 |
| 2,379,647 | Muerle | July 3, 1945 |
| 1,574,972 | Horvath | Mar. 2, 1926 |
| 1,574,973 | Horvath | Mar. 2, 1926 |
| 1,467,762 | King | Sept. 11, 1923 |
| 2,210,277 | Bullock | Aug. 6, 1940 |
| 1,497,633 | Page | June 10, 1924 |
| 1,165,421 | Koenig | Dec. 28, 1915 |